Sept. 1, 1936.  J. B. WANTZ ET AL  2,052,956
X-RAY OPERATING TABLE
Filed June 20, 1928  7 Sheets-Sheet 1
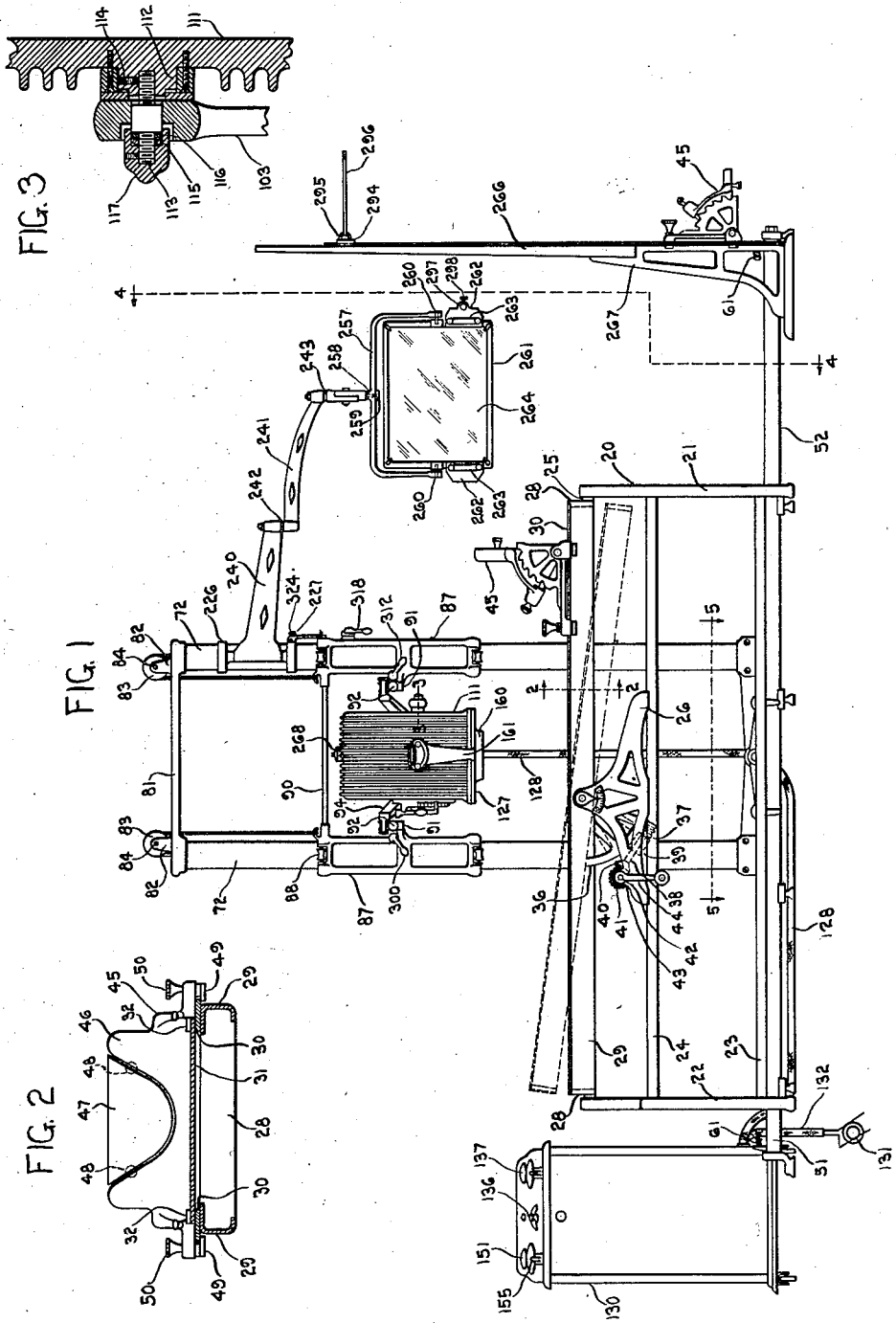
INVENTOR
JULIUS B. WANTZ
JULIUS J. GROBE
BY
ATTORNEY

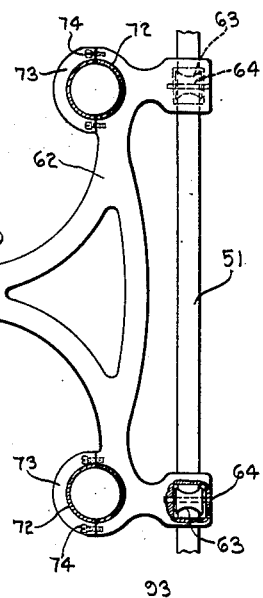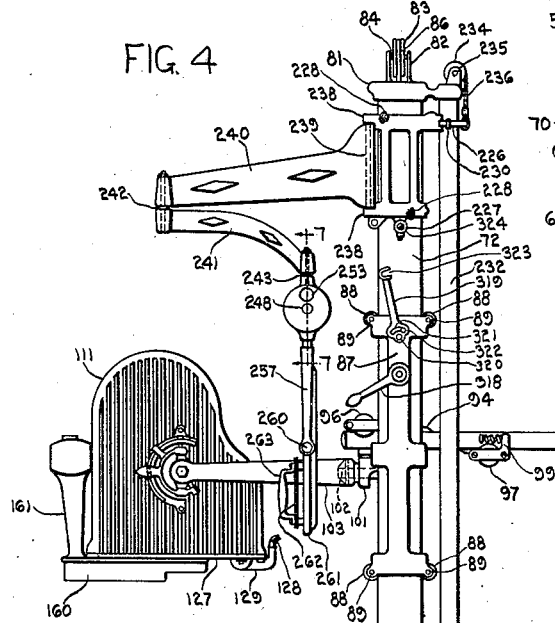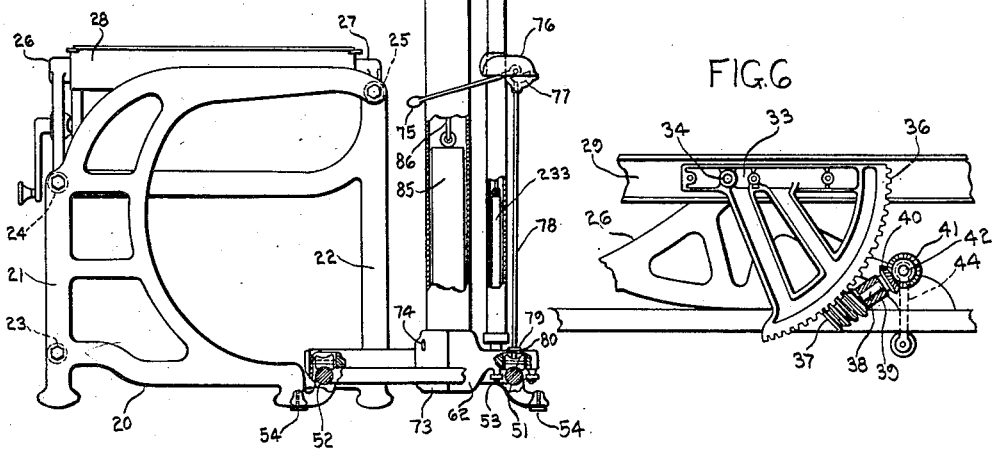

Sept. 1, 1936.  J. B. WANTZ ET AL  2,052,956
X-RAY OPERATING TABLE
Filed June 20, 1928  7 Sheets-Sheet 3
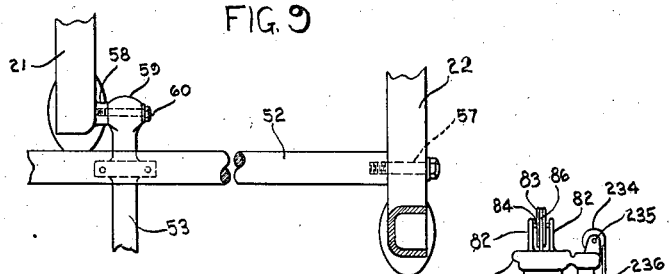
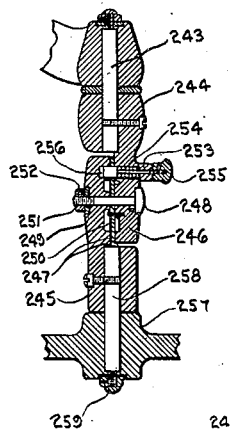
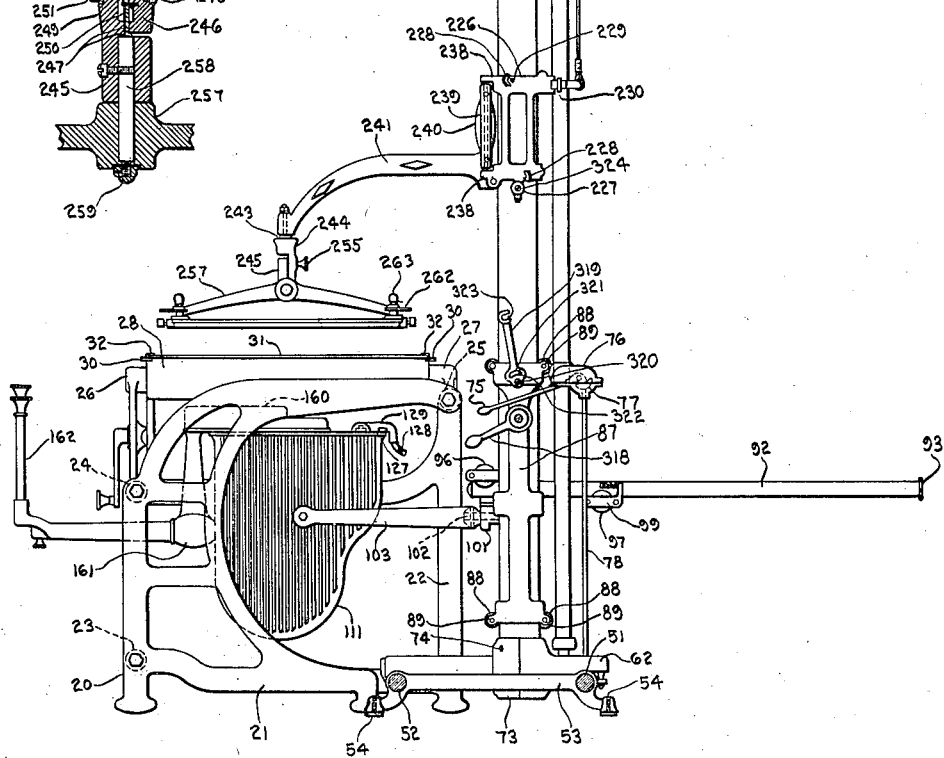
INVENTOR
JULIUS B. WANTZ
JULIUS J. GROBE
BY
ATTORNEY Sept. 1, 1936.　　J. B. WANTZ ET AL　　2,052,956
X-RAY OPERATING TABLE
Filed June 20, 1928　　7 Sheets-Sheet 4
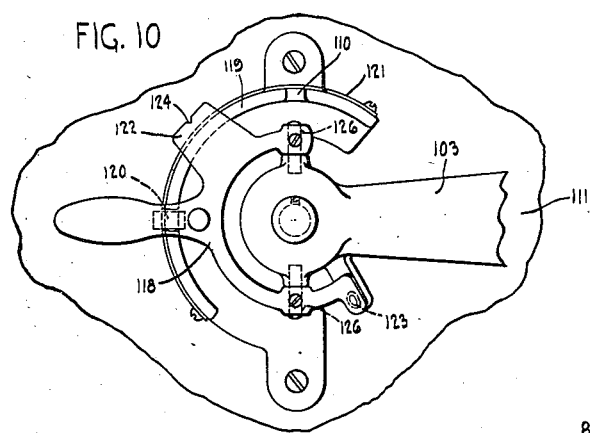
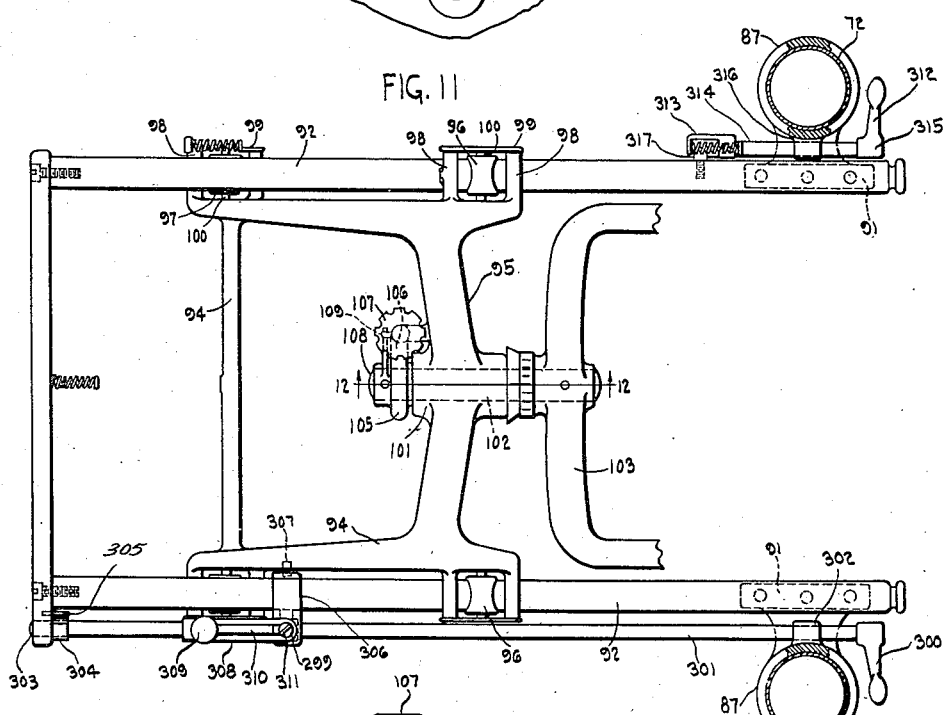
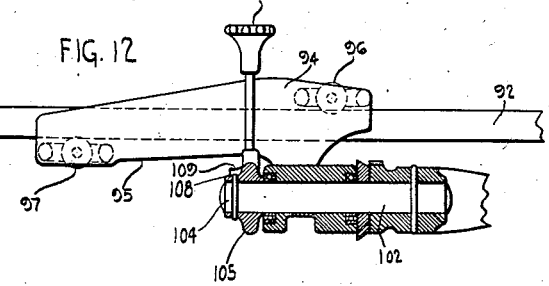
INVENTOR
JULIUS B. WANTZ
JULIUS J. GROBE
BY: *[signature]*
ATTORNEY

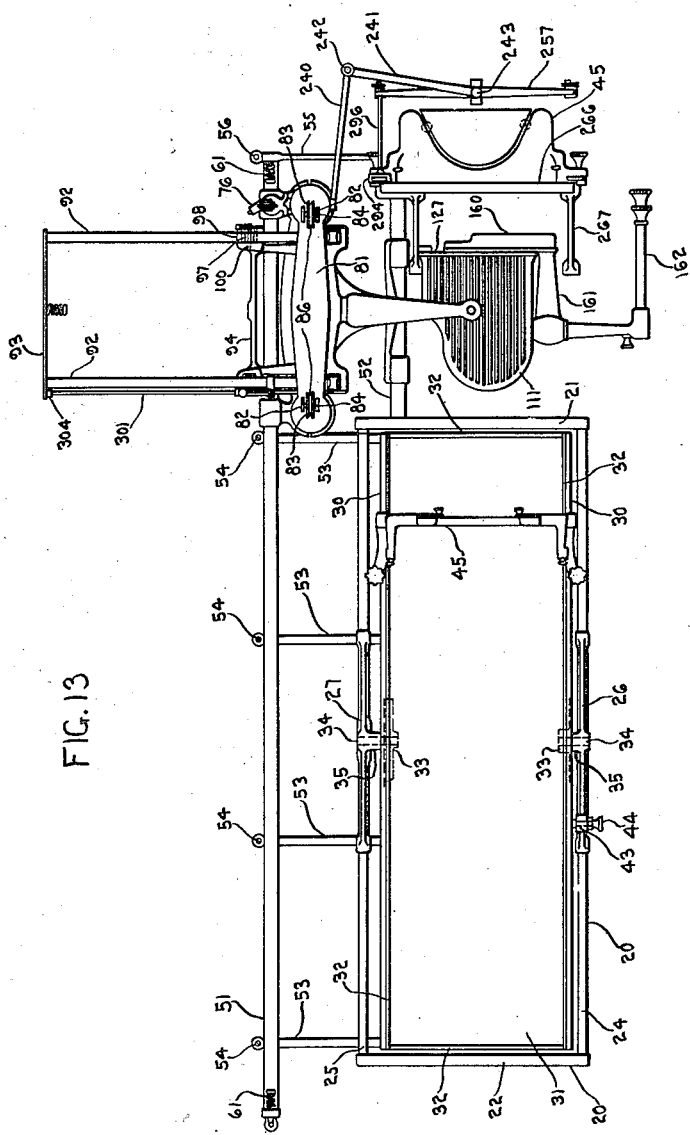

Sept. 1, 1936. J. B. WANTZ ET AL 2,052,956
X-RAY OPERATING TABLE
Filed June 20, 1928 7 Sheets-Sheet 6

INVENTOR
JULIUS B. WANTZ
JULIUS J. GROBE
BY: [signature]
ATTORNEY

Sept. 1, 1936.  J. B. WANTZ ET AL  2,052,956
X-RAY OPERATING TABLE
Filed June 20, 1928   7 Sheets-Sheet 7
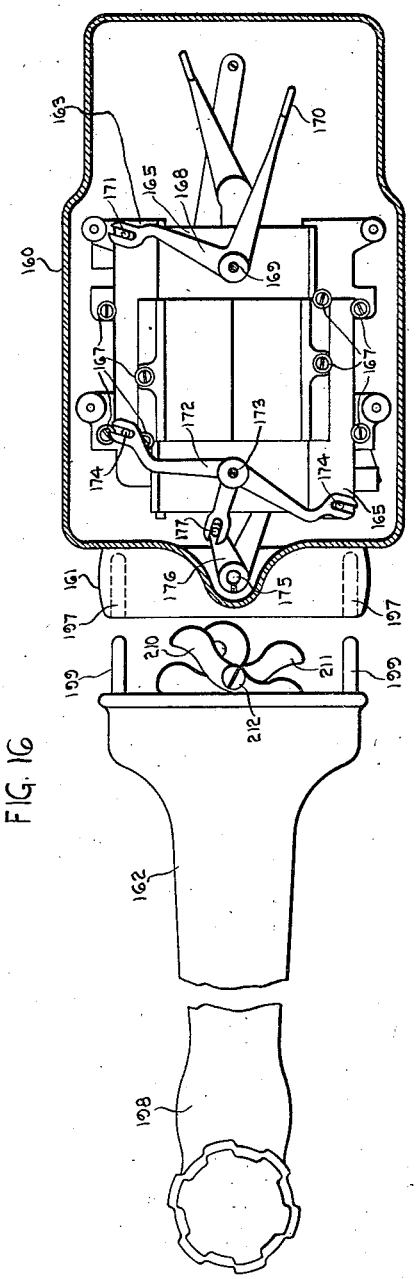
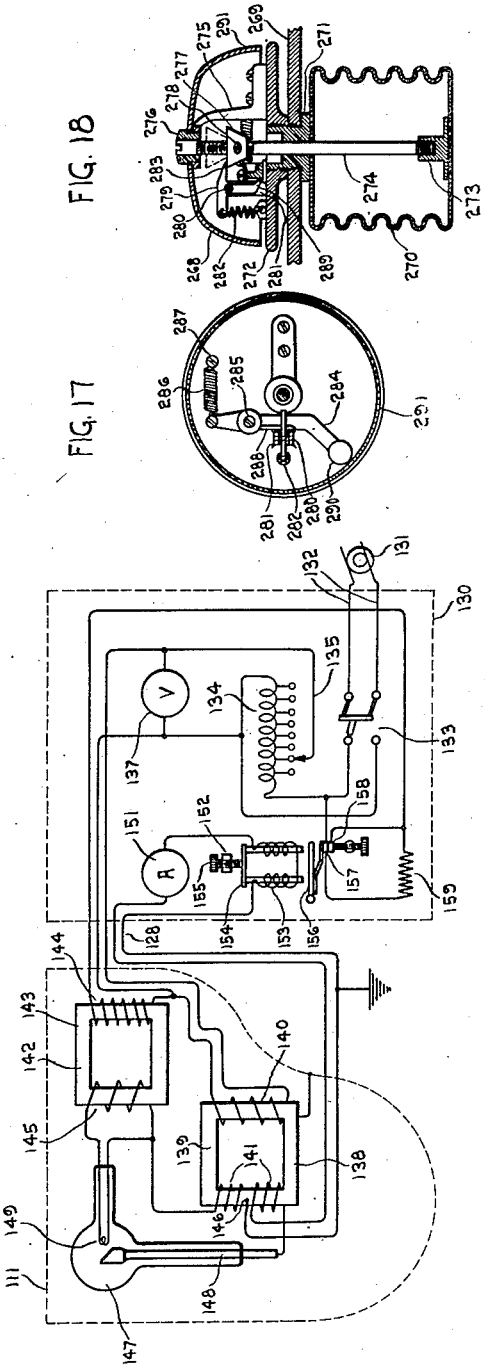
INVENTOR
JULIUS B. WANTZ
JULIUS J. GROBE
BY
ATTORNEY Patented Sept. 1, 1936

2,052,956

UNITED STATES PATENT OFFICE 2,052,956

X-RAY OPERATING TABLE

Julius B. Wantz, Oak Park, and Julius J. Grobe, Chicago, Ill., assignors to General Electric X-Ray Corporation, Chicago, Ill., a corporation of New York Application June 20, 1928, Serial No. 286,825

11 Claims. (Cl. 250—34)

The present invention has to do with the construction and form of an X-ray table and of a tube stand to be used in connection with an oil immersed X-ray tube of relatively high capacity. With such a device, practically all of the diagnostic X-ray work of a medical or physical nature of the present time, including all classes of radiography, fluoroscopy, and orthodiagraphy, may be readily carried on, not only in the horizontal and vertical positions, but within certain limits in angular positions. Many structures and novelties which are applicable to tubes that are not oil immersed are disclosed and described herein.

The invention relates to a high powered X-ray apparatus particularly intended for medical and surgical use and in which a tube of relatively high capacity is employed. Stated differently, the invention is an improved adaptation of an oil-immersed unit of relatively high capacity to medical and surgical employment, but it must be remembered many details of its structure are applicable to other types of tubes.

With an object of providing such a device in view, it became necessary to produce in the general structure of the type of device illustrated, a counterbalanced tube stand so arranged that the tube holder thereon is capable of substantially universal adjustment; a table top so supported that the tube holder may be positioned either above or below such top, a vertical panel so arranged as to permit the tube holder to be moved therebehind and parallel thereto, and to successfully combine the three generally independent devices in a unitary structure.

Additional and further objects will be apparent from an examination of the specification which follows and the claims which are appended thereto, particular reference being directed to numerous details including shutter operating mechanisms, supporting parts, and accessories to the apparatus.

One of the outstanding features of the particular construction illustrated resides in the very definite attempt to keep all of the rotatable parts of the structure so distributed about their supporting axes that the center of support is approximately coincident with the center of weight. For example, the table top is pivoted on its center and the tube holder is arranged so that its center of weight in all positions is within the area of support. The tube itself is so disposed that its centers of rotation are approximately coincident with its center of weight on both axes.

Included specifically in the objects of the invention the following may be stated.

A tube holder and its support, and a table top, so arranged that the tube holder can be moved above or below the table top, in combination with a panel in a vertical position, said tube holder possessing means whereby it may be made to move behind said panel and parallel therewith.

The combination with an apparatus of the type just described, of a screen holder capable of substantially universal motion and adapted to be used with equal facility in conjunction with the table and vertical panel.

The combination with the foregoing device of a screen holder capable of substantially universal motion and having means whereby it and the tube may be moved conjointly or the two may be separated and moved independently.

The provision in an X-ray oil-immersed tube of a tube stand support comprising a base of large area whereby the weight of the tube holder in all positions of adjustment is directly above the area of support.

The provision of such a base in a divisible form and a joint therein capable of limited motion to permit of the positioning of the base sections to adjust themselves for any inequalities in the surface of the supporting object.

The provision of means for supporting a tube stand on an X-ray table comprising a plurality of rails in approximately the same horizontal plane, and a novel supporting unit for a tube stand mounted on said rails.

The provision of a pivoted joint between sets of rollers adapted to travel on supporting rails to permit of the adjustment of such rollers relative to one another to compensate for any inequalities in the positions of the supporting rails.

The provision in a device such as is herein described of rollers that are of a shape to take care of variations in the rails due to rail spacing.

The provision of a means for supporting a tube holder of the character illustrated comprising a guideway vertically adjustable upon a column and a carriage movable on said guideway and supporting at its one end a joint or series of joints for supporting the tube holder.

The provision of a means for supporting a tube holder of the character just previously mentioned having in addition thereto a guideway extending beyond the tube standard whereby the tube holder may be drawn in behind such standard.

The provision of a plurality of standards for supporting a tube holder in combination with counterweighted sleeves adjustable on such standards and carrying a guideway which is supported therebetween, and roller frames mounted on the guideway for supporting the tube holder when positioned between such roller frames.

The provision of a means such as has been previously mentioned whereby various movements in the supporting device may be produced, such as a pivotal movement of the tube holder about a horizontal axis across a table used in association therewith, and a pivotal movement on an axis transverse to the above, and a joint whereby the tube may be lowered beneath such table.

The provision of a counterbalanced screen holder mounted on a tube column in a device of the character herein above referred to and means for tying said screen holder and said tube holder together for conjoint movement.

The provision of means for separating the tube holder and screen described in the preceding paragraph in combination with means for locking the screen holder in a position to release the tube holder for independent movement.

The provision of a table having a top having an instrumentality associated therewith adapting it to receive both above and below an oil-immersed X-ray unit.

The provision of a table frame and an associated top whereby one end of said table frame is open to permit of the positioning of a tube holder thereat, the principal purpose for such structure being to permit the employment of an X-ray tube for throat work.

The provision of a novel means for tilting a table of the character described.

The provision of a novel means whereby a tube adapted to be used with a table may be conjointly employed upon a panel in juxtaposition to said table.

The provision of means whereby an X-ray tube may be used conjointly with a table and a screen, and the provision therewith of a fluoroscopic screen which is adapted to be used in conjunction with said table top and with said vertical screen.

The combination upon a single mounting in association with an X-ray tube, of a table top, a vertical panel, and a fluoroscopic screen, and means for using said X-ray tube in conjunction with said screen in respect to both said table top and said vertical panel.

The direct attachment to an oil-immersed outfit of a shutter whereby to control the X-ray emanation from the tube within such apparatus.

The provision of an oil-immersed X-ray apparatus and a shutter for controlling the X-ray emanations therefrom in combination with auxiliary means for controlling such shutter from a more remote point than the normal control means therefor.

The combination with an oil-immersed X-ray outfit having as a part thereof a shutter in combination with a separable control means for such shutter.

A cross-indexing means for an apparatus of the character just previously described.

These, and such other objects, as may hereinafter appear, are obtained by the novel construction, combination, and arrangement of the various elements of which the apparatus is composed.

One form of the invention is illustrated in the accompanying drawings, comprising seven sheets, and in which:

Figure 1 is a side elevation of an apparatus constructed in accordance with the invention. In this particular view, a screen frame is shown disposed at one side to be out of the way and the X-ray tube holding structure is shown in a position for radiographic work. The holding structure is suspended above the table top. The tiltability of the table top is indicated by the use of dotted lines;

Figure 2 is a sectional view of the table top of the apparatus taken along the line 2—2 of Figure 1.

Figure 3 is an enlarged sectional view of the pivotal support for the tube holder taken along the line 3—3 of Figure 1;

Figure 4 is an elevation, partly in section, along the line 4—4 of Figure 1;

Figure 5 is an enlarged plan view of a portion of the tube stand supporting casting, partly in section, and taken along the line 5—5 of Figure 1;

Figure 6 is an enlarged view shown partly in section, of the gears comprising the top raising mechanism;

Figure 7 is a sectional view of one of the pivot joints for the screen support taken along the line 7—7 of Figure 4;

Figure 8 is an elevation similar to that of Figure 4 but the screen and tube holder in position for horizontal fluoroscopy;

Figure 9 is an enlarged cross-sectional view of the connection between the floor rails and the table whereby pivotal action between the two is rendered possible;

Figure 10 is an enlarged elevation of a device for positioning the tube holder in definite angular relation to the patient holding plane;

Figure 11 is a fragmentary plan view of the movable tube supporting carriage;

Figure 12 is a section of the device shown in Figure 11 and taken along the line 12—12 of Figure 11;

Figure 13 is a plan view of the table shown in Figure 1 with the tube holding element and fluoroscopic screen in position for vertical fluoroscopy; the screen holder being disconnected from simultaneous movement with the tube holder and fixedly positioned with respect to the table as would be the case for orthodiagraphic uses;

Figure 16 is a top view of such shutter mechanism, and it should be noted that in Figures 14, 15, and 16, the views show an auxiliary controlling handle detached from the shutter mechanism;

Figure 17 is a top view in section of a mechanical alarm device for inviting the attention of an operator to an excess in temperature in the insulating oil within the container surrounding the X-ray tube;

Figure 18 is a side elevation in section of the device shown in Figure 17; and

Figure 19 is a schematic view of a circuit adapted to be employed with this device.

Like reference characters are used to indicate similar parts in the several views in the drawings and in the description of the device hereinafter given.

Figure 14:
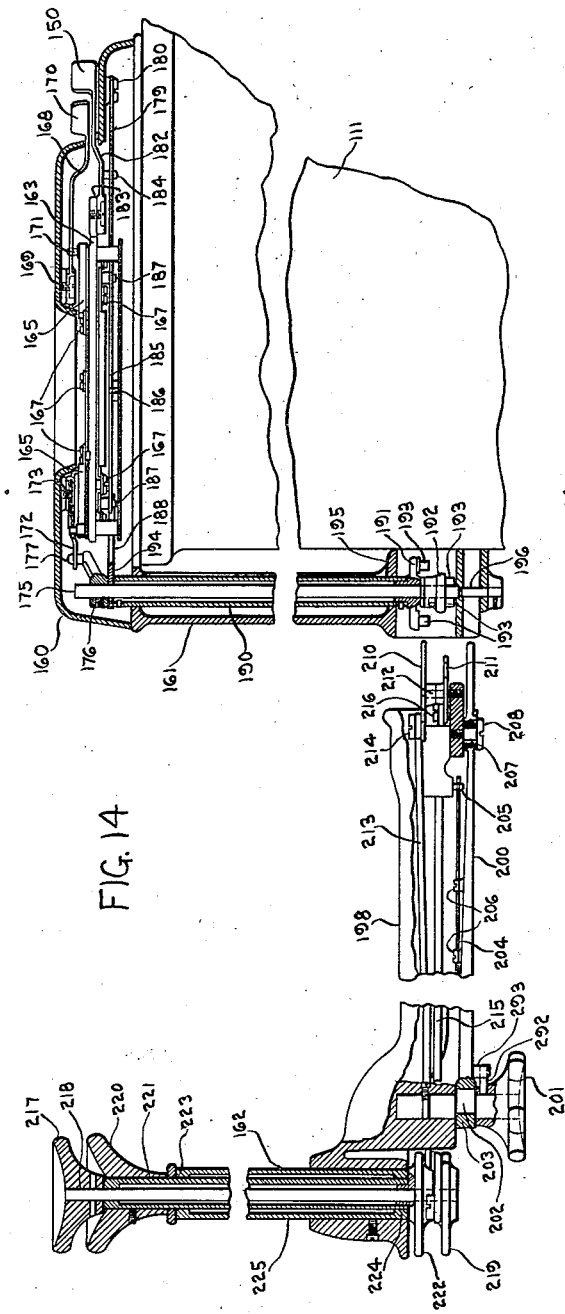
Figure 14 is a side elevation in section of an improved shutter mechanism for use in a device of the nature described.

Reference should first be had to Figure 1. A particular type of table frame is employed. Such frame is collectively designated 20, and comprises a righthand end frame 21 and a lefthand end frame 22. The references to right and left hand are founded upon the positions of these parts in the figure now being described.

A lower outside tie rod is indicated by the numeral 23, and an upper outside tie rod by the numeral 24. An upper inside tie rod is designated 25. (Figure 13.)

An outer table trunnion disposed upon frame 20 is designated 26, and the inner table trunnion 27. (Figure 13.) Castings for the ends of the table top are designated 28, while 29 indicates the side channels for said top. The side strips for said top are noted as 30, and these project laterally beyond the faces of the channels 29 to provide a rail on which a seat is supported. (Figure 2.)

A top 31 for the X-ray table, generally made of wood or other material transparent to X-rays, is provided for said table. Such use of material is common to the industry. About said table top is a metal binding 32 (Figure 2) which provides protecting edges for said top.

Socket castings 33 are provided upon the inner sides of the table top for receiving and holding an axle on which the table top pivots.

Such axle is designated 34 and upon said axle 34 the table top is secured for pivotal movement upon trunnions 26 and 27, the pivots being pinned or secured in a suitable manner within the castings 33. A bearing 35 is provided in each of trunnions 26 and 27 and in said bearings the pivots 34 are rotatably supported.

A worm gear quadrant 36 is secured to one of side members 29 of said table top, and for operating such quadrant there is provided a worm gear 37, which is secured to a shaft 38, said shaft having a bearing 39 secured to the trunnion 26. Said shaft 38 is also provided with a bevel gear 40 at its other end in which a second bevel gear 41 is adapted to cooperate, the latter gear 41 being secured to a shaft 42 rotating in a bearing 43 in trunnion 26.

A crank handle 44 is secured to shaft 42 so that the entire gear mechanism just described is actuated. Motion of the crank handle 44 is transmitted through the bevel gears 40 and 41, the shaft 38 to worm gear 37, and thence communicated to the quadrant 36 whereby the table top is tilted in either direction, and according to the dictates of the operator, subject of course to certain limits fixed by the quadrant itself.

Upon the table top is a combination seat and head-rest 45 best shown in Figure 2 and which is slidably mounted thereon to provide for adjustment. In said seat and headrest 45 is a main supporting casting 46, to which is detachably secured a removable center section 47, the center section 47 being adapted to be secured to the main supporting casting 46 by two thumb screws 48.

Two shouldered clamping screws 49 are secured to head-rest 45. A lock handle 50 is secured to each of said shouldered clamping screws whereby to pull said screw tight against the rail 30 of table top, to lock the seat 45 in any selected position upon the said table top, thus permitting of the head-rest being disposed at any point along table top 31 which particularly suits a patient's needs.

The outer floor rail for the apparatus is designated 51, (Figure 5) and the inner floor rail 52. Tie castings 53 (Figure 4) rest upon the floor, having feet which secure the rails 51 and 52 together and prevent the spreading thereof. A leveling screw 54 is provided at the inner and outer ends of each tie casting 53 whereby to adjust said tie castings in accordance to compensate for the irregularity of the supporting floor.

An end tie between the rails 51 and 52 is designated 55, (right hand end of Figure 13) and leveling screws disposed thereupon are indicated by 56.

A pivotal bolt connection 57 is provided at the closed end of the table and between frame 22 and rail 52 (Figure 9). A bearing stud 58 is secured in frame 21, and a bearing extension 59 is provided on one of the cross ties 53 for engaging the stud 58. A clamping bolt 60 is provided for the previously described joint. The above construction permits of pivotal motion between the table frame 20 and the structure consisting of the rails 51 and 52 and their attached cross ties whereby gross irregularities in the floor can be compensated for, thus preventing undue strains upon and sagging of the different parts of the table and rail structure.

At each end of the rail 51 are stop springs 61 adapted to limit the movement of the tube stand shortly to be described and disposed thereon. For the tube stand there is provided a main tube stand supporting casting 62 (Figure 5) having outside rollers 63 carried upon shafts 64 mounted on the casting. These rollers 63 ride on the rail 51. An auxiliary tube stand supporting casting 65 is also provided, and upon said auxiliary supporting casting are rollers 66, said rollers being carried upon shafts 67 mounted on the auxiliary casting 65. These rollers 66 rest on the rail 52.

The castings 65 and 62 are connected together by a stud 68 comprising two sections, one eccentric to the other, so that by rotation of it in its bearing in casting 65, relative movement of the castings 65 and 62 may be had. The tube stand columns 72 which are carried by the casting 62 thus may be adjusted for the purpose of providing squareness with respect to the floor and in a direction transverse to the table top.

The eccentric portion of stud 68 which is mounted in the bearing in casting 62 is designated 69. A saw slot 70 is provided in the face of the other part of the stud 68 whereby to facilitate it being rotated. A lock screw 71 for holding stud 68 in any adjusted position is also provided. Thus any adjusted relation between castings 62 and 65 may be maintained indefinitely.

The vertical columns 72 are thus supported on casting 62. The casting 62 is formed with caps 73 for securing the tube columns 72, said columns 72 being held in position by means of screws 74 passing through the caps 73, said screws being adapted to maintain said columns 72 in substantially rigid connection with casting 62.

A lock lever 75 forms a part of a locking device adapted to prevent longitudinal movement of the tube stand upon rails 51 and 52, there being a supporting casting 76 for said lock lever. A cam 77 for such locking device is adapted to actuate a plunger rod 78 having a bearing 79, the end of which rod having a friction surface 80 cooperating with rail 51 whereby to engage such rail sufficiently rigidly to prevent longitudinal movement. Actuating the lever 75 releases or impresses surface 80 from engagement upon rail 51 whereby adjustment may be had and when attained maintained against displacement.

An upper cross tie 81 is provided between the tops of the columns 72. Upon the cross tie 81 are pulley bearing extensions 82, and upon these latter are counterweight pulleys 83. A shaft 84 is provided for each of the pulleys 83, and the counterweights 85 are supported within the columns 72 by a cable 86, the end of the cable not secured to the counterweights 85 being secured to the main supporting frame for the tube holder.

The columns 72, carried by the traveling support, comprising the castings 62 and 65, form a tube stand or carriage movable on and longitudinally of the rails 51 and 52, the rollers 63 and 66 permitting said carriage to move easily on the rails. The X-ray tube and its associated energizing means are mounted in a casing 111, which is supported on the columns 72 by means of a frame comprising sleeves 87, which are slidingly mounted on the columns 72, (Figure 4) and within the sleeves 87 are rollers 88 which work against the tube columns 72. Said rollers 88 operate upon shafts 89 plainly visible in the last referred to figure.

A cross tie 90 is provided between said sleeves 87 (Figure 1). The sleeves 87 have extensions 91 in which horizontally extending guideways or rods 92 are mounted. A cross brace 93 is provided at the outer end of said guideways 92.

A movable supporting frame 94 is mounted between the rails 92, the main casting thereof being designated 95. Upon said main casting 95 are rollers 96 adapted to engage the upper side of rails 92, while on the under side are rollers 97, which rollers are mounted on the casting 95 below the rails 92.

Lateral extensions 98 are provided upon casting 95, and it is between said lateral extensions that the rollers 96 and 97 are disposed. (Figures 11 and 12.) A cross strip 99 is disposed between extensions 98, and to said cross strip a shaft 100 is secured. Upon said shaft 100 rollers 96 and 97 freely rotate.

A bearing 101 in the main casting 95 is provided to permit of the adjustment of the tube holder shortly to be described, on a horizontal pivot transversely to the table top. A stud 102 is pivotally mounted in said bearing 101, and a fork 103 is pinned to said stud 102.

There is an extension 104 upon stud 102 upon which a split collar 105 is disposed, said collar having extensions 106, and a hand screw 107 for drawing said extensions 106 together, to thus insure pressure against said extension, whereby rotation of the fork 103 is prevented.

An outside locking collar 108 is also provided upon said extension 104 as are stops 109 against which said second extension rests.

The X-ray tube and the tube energizing instrumentalities are contained in a tank 111 having side bosses 112. (Figure 3.) A stud 113 projects from each boss 112 and a screw 114 is provided for securing stud 113 in position within boss 112. A friction washer 115 surrounds stud 113, and a second washer 116 is provided below said friction washer 115. A lock nut 117 is secured to stud 113. Thus the tank 111 is made readily maintainable in any adjusted position, the friction holding device being sufficiently secure for this purpose.

A pawl supporting casting 118 is secured upon fork 103, and a scale supporting casting 119 is mounted on tank 111. (Figure 10.) A notch 120 for positioning said tank in horizontal position for work below or above the table is provided. A notch 110 for positioning the tank for vertical work is also provided. A scale 121 for radiographic work is secured on said scale casting 119. An extension 122 is provided on the pawl supporting casting 118 to co-operate with notches 110 and 120. A spring 123 exerting tension tending to push the extension 122 and notches 110 and 120 into engagement is provided. An index 124 co-operating with scale 121 is also provided. A pivot 126 is provided for said pawl supporting casting 118 upon the fork 103. The means just described permits of a plurality of fixed positions for the tank 111, and means for positioning the tank 111 in other positions in accordance with the scale 121.

Tank 111 is provided with a cover 127, a portion of which is transparent to X-light.

Intermediate the tank 111 and its control stand is a cable 128 through which all of the conduits intermediate the control stand and the tube-energizing instrumentalities within the tank 111 pass. (Figure 19.) The low tension connections are indicated 129, and 130 designates the above referred to control stand.

From a source of power 131, a cable 132 extends to a main switch 133. In association with the circuit is an auto-transformer 134 provided with a variable tap 135. The latter is adapted to be regulated by a lever 136. In said low tension circuit is a voltmeter 137.

A high tension transformer is designated 138 and it is provided with a core 139. The primary of said high tension transformer is designated 140 and the secondary thereof 141.

A filament transformer 142 is also provided and it has a core 143, a primary designated 144, and the secondary 145. A ground connection 146 is provided between the secondary 141 of the high tension transformer 138 and the core 139 of said high tension transformer, between tank 111 and said core and to ground as illustrated.

An X-ray tube 147 comprising an anode 148, and a cathode 149, is disposed in said tank 111. A cable 128 is provided between the control stand 130 and the tank 111.

A milliammeter 151 is shown in the secondary circuit of the high tension transformer 138. A stabilizer 152 comprising a coil 153 and a stabilizer core 154 is disposed in the secondary circuit, depending from the secondary 141 of said high tension transformer 138, said stabilizer being provided with a handle 155 for adjusting the position of the stabilizer core 154 with respect to an armature 156.

The stabilizer armature 156 is associated with a movable stabilizer contact 157 and a stationary stabilizer contact 158. A stabilizer resistance 159 is provided, as is usual in stabilizer constructions. Movement of the armature cuts into and out of the circuit energizing the filament transformer 142, the resistance 159, whereby a regulated current of any desired amount is adapted to be passed between the cathode 149 and the anode 148 of the X-ray tube 147, the adjustment of the stabilizer core 154 by handle 155 permitting of regulation of the stabilizer. The use of such current controlling devices is conventional in present day practice in X-ray technique.

Figure 15:
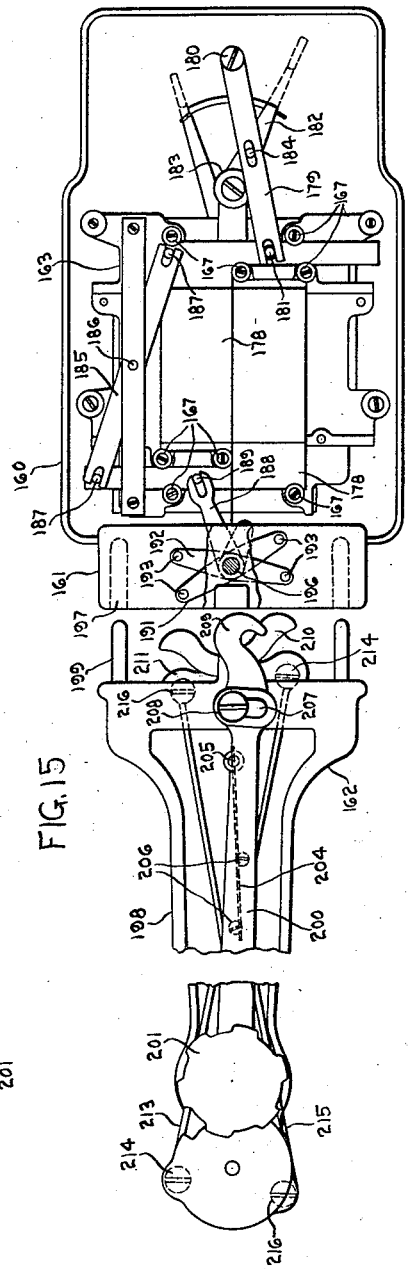
Figure 15 is a lower view of such shutter mechanism.

An X-ray shutter 160 (Figures 14, 15, and 16) is disposed upon the tank 111, and this is provided with a control extension 161. An auxiliary and removable shutter handle 162 is also provided.

The shutter comprises a shutter plate 163, upper shutter blades 165, and bearings 167 for said shutter blades. A main lever 168 is provided for the upper shutter blades 165, a pivot 169 being provided for said lever 168. A thumb latch 170 is secured to the end of main lever 168, and a connection 171 is provided between said lever 168 and the shutter blade 165.

An auxiliary lever 172 for the upper shutter blades 165 is provided, said lever having a pivot 173, and a pivotal connection 174 between said lever 172 and the upper shutter blades.

A control shaft 175 for actuating the auxiliary lever 172 is provided, and there is a crank 176 connected to said control shaft in any desired manner, as for instance, by means of the set screw shown. A pivotal connection 177 is provided between auxiliary lever 172 and crank 176.

The lower shutter blades are designated 178. They operate in a direction at ninety degrees to that of the upper shutter blades 165. A lever 179 is provided for actuating said blades 178. The pivotal point or support for lever 179 is designated 180, and 181 is the pivotal connection between the shutter blades 178 and the lever 179.

An operating lever 182 for the main shutter lever 179 for the lower shutter blades 178 is provided with a pivotal point of support 183, and a pivotal connection 184 extends from the operating lever 182 to the main operating lever for the lower shutter blade 178. The lever 182 terminates in a thumb latch 150 brought out in close proximity to the thumb latch 170. A lever 185 for communicating motion from one lower shutter blade to the other is also provided. This lever 185 has a pivotal point support 186 and pivotal connections 187 intermediate said lever 185 and the shutter blades 178.

An auxiliary operating lever 188 is provided for said lower shutter blades 178, and a pivotal connection 189 is arranged between said lever and said lower shutter blades 178. By the operation of the two latches 170 and 150, the blades of the shutter may be opened or closed to permit of a large or small emanation of X-light from tank 111.

A tube 190 to which the auxiliary operating lever 188 is fastened is used for communicating motion between this lever and the auxiliary shutter control. A lower lever 191 for operating the lower shutter blades 178 from the auxiliary control is also provided and likewise a lower lever 192 is provided for operating the upper shutter blades 165 from the auxiliary control.

The follower points 193 are disposed upon the levers 191 and 192, and the upper bearing 194 and lower bearing 195 are provided for torsion shaft 175 and tube 190.

A clamping lock is also provided. Sockets 197 for dowel pins 199 for positioning the auxiliary control handle are shown, and a main casting 198 is provided for the auxiliary control lever.

A locking rod 200 for securing the auxiliary control handle in position is also disclosed. A locking handle 201 comprising an eccentric locking cam 202 is adapted to operate in a bearing 203 upon the locking rod 200. A leaf spring 204 is adapted to hold the locking rod in operative position. The fixed end 205 of leaf spring 204 is secured on the main casting 198, and clamping points 206 of said leaf spring hold such spring secure upon said clamping rod.

There is an arc shaped hole 207 in said clamping rod, and a stud 208 cooperating with said arc shaped hole 207. A hook 209 is provided in the end of said clamping rod to cooperate with the receptacle 196 therefor on the main casting 198.

A cam lever 210 is provided for actuating the lower shutter blades, and a second cam lever 211 is provided for actuating the upper shutter blades. A pivotal point 212 is provided for said cam levers 210 and 211, and a link 213 connects the cam lever 210 to the lower operating handle 220. The pivotal points at the ends of the link 213 are designated 214.

A link 215 for connecting the cam lever 211 for the upper blades 178 to the upper operating handle 217 has at its ends pivotal points 216. The upper operating handle 217 is pinned to a shaft 218. At the end of the shaft 218 is a lever 219.

The lower operating handle is designated 220 and there is a torsion tube 221 for said lower handle 220 and to which said handle is secured. A lever 222 is secured to the torsion tube 221, and said tube is provided with an upper bearing 223 and a lower bearing 224. A housing 225 extends over torsion tube 221. Thus the shutters may be operated either by the integral shutter controls or by the remote handles 217 and 220. The auxiliary handle may be removed when not required.

It can readily be seen that two points of control are provided for the shutter. It may be controlled either by means of thumb latches 150 and 170 or by means of the control handles 217 and 220 on the auxiliary control 162. The former is usually employed for radiographic work when the auxiliary control handle 162 has been removed. The auxiliary control handle 162 is used primarily during fluoroscopic examinations where the thumb latches 150 and 170 would not be readily accessible, owing to the position of the tube holder, either beneath the table, or behind the vertical panel used for vertical fluoroscopy.

In such case, the auxiliary control not only serves as a means of shutter control, but it is also a handle whereby the tube holder is moved during the examination of the patient.

The method of removing and positioning the auxiliary control handle 162 should be readily apparent from the drawings. All that need be done is to push the handle in position so that the dowel pins 199 cooperate with the sockets 197 provided for them. In this case, the hook 209, owing to its conformation, will snap into position in the socket provided for it, its hooked surface cooperating with the pin 196 with which the socket is provided.

Rotation of handle 201 imparts circular movement to the hook 209, through the interaction of the pin 202, which is secured to the handle 201, with the stop 203 forming part of the locking rod 200 of which the hook 209 is a portion. At the same time there will be a drawing-in motion imparted to the hook due to the action of the lower bearing 203 of the locking rod 200 with the cam surface 202. These simultaneous motions of the hook 209, working in conjunction with the socket 196, serve to tightly draw and securely position the auxiliay handle 162 on the control extension 161, so that the entire tube unit can be readily moved by means of this auxiliary control.

During the time that the action above described is taking place, the cams 210 and 211 are engaging the follower points 193 on the levers 191 and 192 and through the interaction of these cam surfaces and follower points, the handles 217 and 220 are rotated so that their position conforms with the position of the sets of shutter blades which they control. In this fashion the control elements index themselves automatically upon being positioned in the manner described. After the auxiliary control handle has thus been positioned, motion of the handles 217 and 220 will be communicated along the channels previously described and will cause corresponding movement of the shutter blades.

Upon the tube-supporting column 72 is an auxiliary sleeve 226 (Figure 1) for supporting a screen holder. Upon said sleeve 226 is a pivotal connection 227 intermediate said screen holder sleeve and the sleeve on said main frame. Main antifriction rollers 228 are provided on sleeve 226, and said rollers are provided with shafts 229. Auxiliary rollers 230 are also provided. A tube 232 providing a housing for a counterweight 233 for the screen supporting frame is disclosed.

A pulley 234 over which the cable 236 passes is disposed intermediate the counterweight 233 and the screen support 226, said pulley 234 being mounted upon a shaft 235.

Auxiliary rollers 230 operating against said counterweight tube key the sleeve against rotation upon the columns 72.

Upon said sleeve are ears 238, which provide mounting for the shaft 239, the shaft forming a pivotal connection on a vertical axis for a screen supporting arm. The first of the screen supporting arms adapted to be secured to the shaft 239 is designated 240. A second screen supporting arm is similarly mounted upon said first screen supporting arm 240, the latter being designated 241. The pivotal connection between arms 240 and 241 is designated 242.

A pivotal joint 243 is provided between said second supporting arm 241 and a horizontal pivot member, the first section of which horizontal pivot member is designated 244, and the second section of said member being designated 245. The friction joint of said horizontal pivot member is designated 246, and has associated between its friction surfaces 247, a friction washer 250. Intermediate said first and second sections, 244 and 245, is a central stud 248 which is held in adjusted position through the medium of a washer 249, a nut 251, and a lock screw 252. A plunger 253, which is provided with a spring 254, and a handle 255 is associated with said friction joint cooperating with said plunger holes 256.

There is also provided a screen supporting fork 257 and in which there is rotatable a stud 258 fixed to the second section of said horizontal pivot member, there being a lock nut 259 on the end of said stud.

Pivots 260 are arranged between said screen frame and fork, the screen frame being designated 261.

At each end of said frame are protection plates 262 to prevent injury of the operator's hand by X-light, and to prevent undue damage to the apparatus during its use.

At each end of the screen frame 261 and in juxtaposition to the protection plates 262 are handles 263 whereby the apparatus may be moved. Within the frame 261 is a fluoroscopic screen 264 and lead glass covering therefor.

At the end of the apparatus is a vertical panel 266 for fluoroscopy. Said panel is supported by standards 267.

Adjustably disposed upon said panels and the frames for supporting said panels is a patient's support which may comprise the same members as employed upon the table top 31. A similar locking arrangement for securing said member in adjusted position upon the vertical screen 266 is also provided. This part is interchangeable and it is only necessary to procure one thereof for use with the apparatus, the same being adapted for ready movement from the table to the vertical panels.

Means are also provided on the vertical panel 266 whereby the screen frame can be secured in any desired position of adjustment for the purpose of doing ortho-diagraphic work. In doing this work, it is necessary, in order to fix the position of the screen against movement, to move the tube holder element. The connection between the screen supporting structure and the tube holder is opened and the screen secured in its desired position by means of the device shown in Figure 1.

A sliding member 294 engages side rails on the vertical panel 266 and can be locked in any desired position of adjustment by means of the lock screw 295. A rod 296 is positioned in the clamping device just described and serves to cooperate with the socket 297 which is an integral part of the screen frame 261. A set screw 298 is provided for locking the screen frame in any desired spacing from the face of the vertical panel 266 on the rod 296. In this manner the screen frame is held in the desired position and the tube holder is relatively movable with respect to it.

A warning device 268 shown in Figures 17 and 18, is provided. This is adapted to be secured to the wall 269 of the tube container 111. Said device comprises the sylphon device 270. Within said sylphon device 270 and soldered thereto is a shank 271 which passes through the wall 269 of the tube container 111. A locking device 272 is provided for securing said sylphon in position within the tube container, this locking device also providing a base for the mechanism of the warning device 268 hereinabove referred to. A receptacle 273 for a pusher rod 274 is secured to the inner side of the sylphon. A bearing support 275 is provided, on which is mounted the upper bearing 276 for said pusher rod 274. Upon said pusher rod 274 is an adjustable tapered collar 277. A lock screw 278 is provided in said collar 277 for securing it in position on said pusher rod 274.

A bell crank 279 having a point of pivotal movement 280, and supported upon a member 281 is provided with a spring 282. There is a follower point 283 on said bell crank 279, and a striker 284. Said striker 284 has a pivotal point of support 285, and said striker 284 is also provided with a spring 286. A button 287 for securing one end of said spring 286 to the locking device 272 is also shown. There is also a cam surface 288 on the striker 284, and upon the bell crank 279. A part 289 is adapted to cooperate with the cam surface 288 of the striker 284. A hammer 290 upon the lever 284 is adapted to strike a bell 291, such warning apparatus being adapted to be set into motion as an incident to the movement of the pusher rod 274.

Transverse movement of the tube holder across the table frame can be prevented by means of the lock indicated at 299. This lock is operated through the medium of a handle 300 which is secured to a rod 301, which rotates in bearings 302 and 303. A stop device 304 prevents transverse movement of the rod 301 and also serves to prevent too great rotational movement through the interaction of a pin 305 with a notch on the stop device or collar 304.

The drawing of collar 306 outwardly in Figure 11 is obtained through the movement of an eccentric collar mounted to rotate with rod 301 and engaging the cam surface inside of the extension on collar 306.

Stereoscopic movement of the tube holder is also provided for in this construction through the medium of a link 308. The link 308 normally is free to slide with the collar 306. When the shift necessary for stereoscopic work is desired, link 308 is held against movement through the medium of a thumb screw 309. The tube holder device is then capable only of limited movement necessary for stereoscopic work, the limiting of the movement being done by an aperture 310 in the link 308 cooperating with a stud 311.

When it is desired to place a tube holder beneath the table top, it is essential that transverse movement of the tube holder be limited. This is taken care of by means of an adjustable stop indicated at 312. This consists of a spring bumper 313 mounted on a shaft 314 and actuated by a handle 315. The shaft is secured in position by means of the bearings 316 and 317 respectively. Vertical movement of the tube holder frame can be prevented by means of a lock indicated at 318.

Means are provided for locking the fluoroscopic screen and the tube holder together for combined movement, consisting of a locking lever 319 pivoted at 320 and limited in its motion by the interaction of a slot 321 with a pin 322. The locking device terminates in a hook 323 which cooperates with a button 324 on the sleeve, which supports the fluoroscopic screen mechanism.

The present invention adapts high capacity X-ray tubes to oil-immersion with facilities for wide application. The application and the drawings accompanying such application are based upon a machine developed after exhaustive experiments and the parts illustrated are those in an actual operating device which has been tested out and found to be highly efficient.

The first difficulty overcome was adapting an apparatus, appliances, and appurtenances to use with a high capacity tube under oil insulation for the weight of a tube, its insulation, a container therefor, and energizing equipment which must necessarily be enclosed within such container, is so great that none of the present types of table and panel apparatus could be employed. Such weight is approximately two hundred pounds, as at present arranged.

In formulating an entirely new design for an oil-immersed unit of this character, certain additional and new combinations were found to be practicable. The combination with a table of a vertical panel, such association bringing about an entirely new table structure, was discovered, and likewise an entirely new base or support for tube standards has been developed. The combination of a table and panel of itself is novel, and the structural details relating to such association are wholly unique.

It is likewise new to associate a fluoroscopic screen with a table and at the same time have the fluoroscopic screen useful in association with a vertical panel. To provide for such association, it was necessary to formulate an entirely new apparatus for supporting such screen whereby sufficient flexibility of operation could be had therefor.

With the advent of this new combination, that is, the combination of a table and panel and the adaptation of a screen thereto, it was discovered that instead of associating the tube and screen as a unit, the parts being separable at will, that it was more desirable to provide a screen operating independently of the tube but adapted to be associated with the tube carriage under certain circumstances.

In this association, there are novelties not heretofore found in X-ray tables or the like. This novelty resides particularly in mounting the screen upon a vertical standard, the standard forming a part of the support for the X-ray tube.

The device was so comprehensive in its structure that it was desirable to combine therewith, and it became apparent that such combinations were entirely feasible, additional appurtenances whereby the apparatus might be employed for every known medical, or therapeutic use of X-ray tubes save "deep therapy".

For example, a new type of table was devised and it is provided with an adjustable rest which rest may be transferred to and made a part of the vertical panel, there to provide a seat. The adjustability of the table is such that it may be used for throat work, a difficult operation with any other type of table. The table is further adapted in its present arrangement for efficient orthodiagraphy, in fact, more efficient than any device heretofore provided for such purposes.

With the provision of oil insulation, the necessity for exposed high tension wires has been ended, and the apparatus may be safely employed with tubes of high capacity without fear of shocking patient or operator, and without the usual precautions which have been necessary with exposed high tension wires and which have reduced the efficiency of the apparatus and its ease of manipulation.

This ultra-safety has permitted of the apparatus being employed in operating rooms where the personnel has not been educated to avoid high tension wires, and in fact, the apparatus when in operation is free from danger for there are no exposed high tension wires which can come in contact with patient, operator, attendant or spectator. The convenience of operation likewise is quite manifest, and there is much less danger from X-ray burns because the tube is entirely encased in a container which except for a window therein is opaque to X-light.

The useful beam of X-light emanating from the tube through a shutter comprises the only X-light which extends beyond the tank during the operation of the device. It is to be recalled, of course, that concurrently with this application there are a number of other applications, the inventions of the applicant Julius B. Wantz, or of the joint inventors here, covering shielding apparatus adapted for special application in this type of apparatus. When a tank, tube, oil immersion, and tube energizing apparatus, weighing approximately two hundred pounds, and the shutter adapted to be used therewith and illustrated in the present instance are employed it is desirable to provide more than a single standard for the support of the container, and two such standards are found to be highly efficient. In order that the tank might be used both above and below a table and also in association with the vertical panel, a suitable carriage is devised for vertical adjustment upon said standards, there being pivotal connections thereon whereby the tank may be inverted, or used in a sidewise position, the beam in the first instance to be projected downwardly or upwardly, and in the second horizontally, as required.

The apparatus provides means for holding the tube in any one of these positions and at an angle so that the X-light may be projected from different directions from those named, as for example, in any useful direction. The flexibility of this device, in that the carriage may be adjusted lengthwise and transversely of the table and vertically of the panel, together with the angular adjustments just referred to, is greater than in any X-ray tube supporting device even though the latter is only a fraction of the weight of the present apparatus.

The table and panel have as a part thereof supports that are common. On these supports is disposed the base for the standard supporting the tube head so that there may be an horizontal adjustment at any point between one extreme end of the table and the panel, beyond the other end of the table. The vertical adjustment of the tube head is limited only by the height of the standards employed therewith. The structure of a standard base is such that the tube head, no matter where positioned, falls within such base, so that the center of weight of the apparatus is always within the limits of such base, preventing any possibility of tilting.

The table top, above and below which the tube head may operate, is made tiltable, simplified tilting means being employed therefor. The tube head in order to be used below the table is pulled back, that is retracted to the rear of the table and dropped down to a position below the table, its position being inverted at some time while retracted. The tube head may be brought close to or held far away from the table either above or therebelow.

In order that the tube head may be readily moved to a position in association with the vertical panel, the table support adjacent said panel is U-shaped, that is, it is open on one side so that it is unnecessary to retract the tube head in order to bring the tube into place in back of the panel. In this structure there is a decided and unique novelty.

The screen, as previously indicated, instead of being mounted in association with a tube, is mounted upon a standard. In this instance such standard is common to a support for the tube head, but this is not necessary for the efficiency of the screen. When so associated with the standard for the tube head, it is customary and usual and as illustrated in the present instance, to provide a locking means whereby the screen and carriage for the tube head may be made to move conjointly.

When the tube is employed beneath the table, the screen is placed in a horizontal position by the adjustment of the arms supporting such screen and with each movement of the tube which is necessarily a movement of the tube standards, the screen moves therewith. This relates of course only to the movement of the tube and screen lengthwise of the table, it being necessary to adjust the screen to compensate for any extended lateral or transverse movement of the tube head.

When the tube is placed in back of the panel, the screen, by a folding of the arms thereof, is adapted to pass said panel and to be brought out on the far side thereof, that is, at the extreme righthand side of Figure 1 (see Figure 13). The patient is disposed intermediate the panel and the screen, and the vertical adjustments of the tube cause a similar adjustment of the screen when locked together.

Of course, as has been previously indicated, when it is desired, the screen may be wholly independent of the movement of the tube head except that it must necessarily move longitudinally of the table conjointly with the tube head.

As hereinabove remarked, the beam of X-light may be controlled by a shutter. When the tube head is employed above the table top, the shutter is normally operated by the controlling members 150 and 170. These are conveniently disposed for such operation, but it would be manifestly inconvenient to employ these members for the manipulation of the shutter when the tube head is beneath the table or is employed in connection with the vertical panel.

Likewise, if the extension handle were to be associated with the tube head so that convenience of manipulation could be had in the two last mentioned positions, it would be difficult at times to manipulate the tube head because such extension handle would be in the way.

In the present apparatus a detachable extension handle is provided in order that the operator may conveniently control the shutter when the tube head is beneath the table and when it is being operated in back of the vertical panel.

This shutter control member is purposely made substantially U-shaped, in order that the links which comprise the actuating parts may be made to pass around or clear the supporting elements associated with the table and at the same time bring the operating handles of the extension member into a convenient position both for the control of the shutters themselves and for the movement of the tube head.

This last convenience is very pronounced for it makes it unnecessary for the operator to assume any ungainly or awkward position during the manipulation of the tube head, such operator always being in a position to control the movement of such tube head either by handling the tube head itself or through the agency of the extension handle and while looking at the screen. This convenience may be much appreciated for at the times when the auxiliary handle is employed the apparatus is being operated in a darkened room, the work for which the handle adapts the apparatus being fluoroscopic in its nature.

When the apparatus is not used fluoroscopically the extension handle may be readily removed. When it is again time to restore it to its operable position, this is readily accomplished for provision of self-indexing connecting members has been made as is fully illustrated and described.

An approved circuit for use with the apparatus is disclosed, there being no high tension wires intermediate the control stand and the tube head. Safety for the tube head is also provided as an examination of Figures 17 and 18, an alarm device, will disclose.

The device, as is indicated above, is very sturdy and necessarily heavier than the average X-ray apparatus. For facilitating its installation and particularly as the installation is new in the provision of horizontally disposed rails for supporting the tube standards, means have been provided whereby such rails may be readily adjusted to compensate for irregularities in the flooring of the room where operated, thus insuring ready movement of the apparatus at the will of the operator.

What is new and we desire to claim by Letters Patent of the United States, is:—

1. In combination, paired parallel horizontal tracks, a support on said tracks, paired parallel vertical standards on said support, a sleeve upon each of said standards, a horizontal rail on each of said sleeves, a carriage on said horizontal rails, a bifurcated member having its axis in parallelism with said rails and pivoted to said carriage, and an X-ray tube holding member mounted between the forks of said bifurcated member.

2. In combination, paired parallel horizontal tracks, a carriage on said tracks, paired parallel vertical standards on said carriage, a paired sleeve upon each of said standards, brackets in opposed relation on said sleeves, horizontal rails on said brackets, said rails extending forwardly of said standards a short distance and rearwardly a greater distance, an X-ray tube carriage on said rails and having front supporting bearings riding upon the top of said rails and guiding bearings engaging the under side thereof, a bifurcated supporting member pivoted in said X-ray tube carriage at the front thereof, said bifurcated member being movable upon an axis parallel to said rails, and an X-ray tube housing pivoted between the furcations of said bifurcated member and movable on an axis normal to the axis of said bifurcated member.

3. In combination, paired parallel horizontal supporting rails, a carriage on said rails, a pair of vertically disposed parallel standards on said carriage, a sleeve on each of said standards and movable vertically thereof, a tie rod intermediate said sleeves preventing relative rotative movement therebetween, brackets at opposite sides of said sleeves, horizontal tracks secured in said brackets and extending forwardly of said standards a relatively short distance, and rearwardly thereof a greater distance, an X-ray tube carriage on said horizontal tracks, said X-ray tube carriage having at its front a pair of rollers engaging the top surface of said tracks and supporting said carriage, said X-ray tube carriage also having rearwardly disposed rollers engaging the under side of said tracks to prevent the tilting of said X-ray tube carriage, a bifurcated member having a bearing part and furcations, said bearing part extending longitudinally of said X-ray tube carriage and being pivoted for movement on a horizontal axis parallel to the supporting tracks of said X-ray tube carriage, and an X-ray tube enclosing member pivoted to the ends of the furcations of said bifurcated member, said tube enclosing member being movable on an axis normal to the axis of the movement of said bifurcated member in said X-ray carriage.

4. In combination, paired parallel horizontal rails, a carriage on said rails, parallel vertically extending standards upon said carriage, a sleeve upon each of said standards and movable from adjacent the top thereof to adjacent said carriage, a tie rod intermediate said sleeves to prevent relative rotative movement therebetween, paired horizontal front and rear extending tracks upon said sleeves, an X-ray tube carriage on said tracks, said X-ray tube carriage having front bearings riding upon the upper surface of said tracks and rear guiding rollers riding upon the under surface of said tracks, said X-ray tube carriage being movable from a position approximate the front of said standards to a position well to the rear thereof, a bifurcated member having a bearing part horizontally disposed in said X-ray tube carriage and extending longitudinally thereof, said bearing part being movable on a horizontal axis substantially equi-distant between said standards, and an X-ray tube enclosing head of less width than the distance between said standards pivoted between the furcations of said bifurcated member and movable upon an axis normal to the axis of movement of said bearing part, said sleeves being movable to elevate and lower said X-ray tube carriage, said bifurcated member being movable in said X-ray tube carriage to provide one angular adjustment for said head, and said head being movable upon a second axis to provide a second angular movement normal to the first mentioned angular movement whereby said tube enclosing head may be used in an upright or reversed position or at any angle therebetween and may be tilted in any of its adjusted positions.

5. In combination, paired horizontal supporting rails, a carriage on said rails, paired vertically extending standards on said carriage, a sleeve on each of said standards, connecting means between said sleeves preventing relative rotary movement therebetween, tracks secured to said sleeves, an X-ray tube carriage movable on said tracks, a bifurcated member pivoted to said carriage, an X-ray tube enclosing member pivoted to said bifurcated member, counter-weights for said X-ray tube enclosing member, and sleeves in said standards, a second sleeve on one of said standards, a fluoroscopic screen upon said second sleeve, a counter-weight for said fluoroscopic screen and sleeve, and means for connecting the sleeve for said fluoroscopic screen and one of the sleeves for supporting said tube head for the conjoint movement of said tube enclosing member and screen.

6. The combination with a pair of rails, of a carriage upon said rails, and a tube stand on said carriage comprising an upright and means for supporting a tube on said upright, said carriage comprising paired members, one member riding on one rail, the other member riding on the other rail, one of said members carrying the upright, and connecting means between said members for tilting said members relatively to one another.

7. In combination, a carriage, a tube stand on said carriage comprising an upright and having a movable tube carrying head thereon, and paired parallel rails, said carriage comprising paired members, one of said members riding on one of said rails, the other of said members riding on the other rail and supporting said tube stand, and an eccentric connection between said paired members for relative adjustment therebetween to vary the angular position of said tube stand.

8. In X-ray apparatus, a pair of parallel rails in approximately the same horizontal plane, a carriage on said rails, a tube stand comprising an upright post on said carriage, and a tube supporting frame adjustable on said post, said carriage comprising two parts, one of said parts having alined rollers at the extremity thereof, the tube stand being held in said part in proximity to said rollers, the other part of said carriage having alined bearings at the extremity thereof, and connecting means extending from one part to the other, said connecting means including means for changing the relative position of the adjacent sections of said parts for angular adjustment of said tube stand relatively to said rails.

9. In X-ray apparatus, a tube stand comprising a post having a tube-carrying head thereon, a carriage for said tube stand, and rails for the support of said carriage, said rails being parallel, and said carriage comprising two parts, each of said parts having alined rollers riding on one of said rails, one of said parts supporting said tube stand, and a pivoted joint between said parts whereby said parts are made relatively movable with said rails providing pivots for movement between said parts.

10. X-ray apparatus comprising an upright having a head thereon and forming a tube stand, a carriage for supporting said tube stand, and paired parallel rails for supporting said carriage, said carriage comprising two parts, one of said parts having a transverse dimension equal substantially to the distance between said rails, and the other a transverse dimension of small magnitude, the first of said parts having rollers at an extremity for engaging one of said rails and supporting said stand adjacent to said rollers, the other of said parts having alined rollers engaging the other rail, and eccentric connecting means between said carriage parts whereby the sections of said parts adjacent to said connecting means are adjusted relatively of one another to modify the angular position of said tube stand.

11. X-ray apparatus comprising an upright having a head thereon and forming a tube stand, a carriage for supporting said head, and paired parallel rails for said carriage, the normal position of said stand being truly vertical, and said carriage comprising two parts, one of said parts having a body of slight transverse magnitude the center of which is disposed over one of said rails, the other part having a body of large transverse dimension disposed intermediate said rails with an extremity on the second of said rails, said second part having means for holding said tube stand adjacent said extremity, and connecting means between said parts comprising a pivoted member eccentrically mounted in one part and extending to the other part, said connecting means being adjustable to move adjacent sections of said parts relatively to one another in a vertical path to modify the vertical adjustment of said standard, and means for locking said connecting means in adjusted position.

JULIUS B. WANTZ.
JULIUS J. GROBE.